United States Patent
Shattah et al.

(10) Patent No.: US 10,515,066 B2
(45) Date of Patent: Dec. 24, 2019

(54) ATOMIC UPDATES OF VERSIONED DATA STRUCTURES

(71) Applicant: Mellanox Technologies, Ltd., Yokneam (IL)

(72) Inventors: Guy Shattah, Tel Aviv (IL); Ariel Almog, Kohav Yair (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/716,729

(22) Filed: Sep. 27, 2017

(65) Prior Publication Data
US 2019/0095475 A1    Mar. 28, 2019

(51) Int. Cl.
*G06F 3/06* (2006.01)
*G06F 16/23* (2019.01)
*G06F 13/16* (2006.01)

(52) U.S. Cl.
CPC .......... *G06F 16/2329* (2019.01); *G06F 3/065* (2013.01); *G06F 3/067* (2013.01); *G06F 3/0619* (2013.01); *G06F 13/1663* (2013.01); *G06F 16/2379* (2019.01)

(58) Field of Classification Search
CPC .......................... G06F 16/2329; G06F 13/1663
See application file for complete search history.

(56) References Cited

U.S. PATENT DOCUMENTS

| | | | |
|---|---|---|---|
| 6,360,220 B1 | 3/2002 | Forin | |
| 7,360,039 B2 | 4/2008 | Jong et al. | |
| RE40,989 E | 11/2009 | Jain et al. | |
| 8,028,133 B2 | 9/2011 | Dice et al. | |
| 8,762,425 B2 | 6/2014 | Tolia et al. | |
| 8,954,986 B2 | 2/2015 | Rajagopalan et al. | |
| 9,037,557 B2 | 5/2015 | Liedes | |
| 9,378,059 B2 | 6/2016 | Huetter et al. | |
| 2007/0239943 A1* | 10/2007 | Dice | G06F 9/466 711/147 |
| 2017/0039143 A1 | 2/2017 | Ritchie et al. | |

* cited by examiner

*Primary Examiner* — Edward J Dudek, Jr.
(74) *Attorney, Agent, or Firm* — Kligler & Associates

(57) ABSTRACT

Described embodiments include an apparatus that includes circuitry, configured to facilitate writing to a shared memory, and a processor. The processor is configured to compute a local current-version number by incrementing a shared current-version number that is stored in the shared memory. The processor is further configured to, subsequently to computing the local current-version number, using the circuitry, atomically write at least part of the local current-version number to a portion of the shared memory that is referenced by the local current-version number. The processor is further configured to, subsequently to atomically writing the at least part of the local current-version number, store data in the shared memory in association with the at least part of the local current-version number, and subsequently to storing the data, atomically overwrite the shared current-version number with the local current-version number. Other embodiments are also described.

28 Claims, 4 Drawing Sheets

ATOMIC UPDATES OF VERSIONED DATA STRUCTURES

FIELD OF THE INVENTION

The present embodiments relate to the storing and sharing of data in computer systems.

BACKGROUND

U.S. Pat. No. 9,378,059, whose disclosure is incorporated herein by reference, describes techniques for parallelizing a high-volume data stream using a data structure that enables lockless access by a multi-threaded application. In some examples, a multi-core computing system includes an application that concurrently executes multiple threads on cores of the system. The multiple threads include one or more send threads each associated with a different lockless data structure that each includes both a circular buffer and a queue. One or more receive threads serially retrieve incoming data from a data stream or input buffer, copy data blocks to one of the circular buffers, and push metadata for the copied data blocks to the queue. Each of the various send threads, concurrent to the operation of the receive threads, dequeues the next metadata from its associated queue, reads respective blocks of data from its associated circular buffers based on metadata information, and offloads the block to a server.

U.S. Pat. No. 8,762,425, whose disclosure is incorporated herein by reference, describes a method for managing a data structure in a memory. An accessor to access a version of the data structure is determined, in which the accessor includes a version number and a fat pointer, in which the version number corresponds to the most recent version of the data structure, and wherein the fat pointer is configured to enable for multiple versions of a linked-data structure to be maintained.

U.S. Pat. No. RE40,989, whose disclosure is incorporated herein by reference, describes performing atomic operations on data entities having an arbitrary size. Version data is associated with a data entity. The version data is saved to a first attribute. The data entity is then accessed. The saved version data is compared to the current version data. If the two are equal, the data entity is valid.

SUMMARY OF THE INVENTION

There is provided, in accordance with some embodiments of the present invention, apparatus that includes circuitry, configured to facilitate writing to a shared memory, and a processor. The processor is configured to compute a local current-version number by incrementing a shared current-version number that is stored in the shared memory. The processor is further configured to, subsequently to computing the local current-version number, using the circuitry, atomically write at least part of the local current-version number to a portion of the shared memory that is referenced by the local current-version number. The processor is further configured to, subsequently to atomically writing the at least part of the local current-version number, store data in the shared memory in association with the at least part of the local current-version number, and, subsequently to storing the data, atomically overwrite the shared current-version number with the local current-version number.

In some embodiments, the processor is configured to compute the local current-version number, atomically write the at least part of the local current-version number, store the data, and atomically overwrite the shared current-version number by executing a first execution thread that writes to the shared memory, and the shared memory is shared between the first execution thread and a second execution thread that reads from the shared memory.

In some embodiments, the processor is configured to atomically write the at least part of the local current-version number, store the data, and atomically overwrite the shared current-version number without locking any portion of the shared memory.

In some embodiments,
the local current-version number includes a cycle number and an index number,
the processor is configured to write the at least part of the local current-version number to the portion of the shared memory by writing the cycle number to the portion of the shared memory,
the shared memory stores a cyclic array, and
the processor is configured to store the data in an element of the cyclic array having the index number.

In some embodiments, the processor is configured to write the at least part of the local current-version number to the element of the cyclic array.

In some embodiments, the cyclic array is a first cyclic array, and the processor is configured to write the at least part of the local current-version number to an element of a second cyclic array having the index number.

In some embodiments, the local current-version number includes a plurality of higher-order bits that represent the cycle number, followed by a plurality of lower-order bits that represent the index number.

There is further provided, in accordance with some embodiments of the present invention, apparatus that includes circuitry, configured to facilitate reading from a shared memory, and a processor. The processor is configured to atomically copy a shared current-version number from the shared memory to a local current-version number. The processor is further configured to, subsequently to atomically copying the shared current-version number, using the circuitry, copy data from a portion of the shared memory that is referenced by the local current-version number. The processor is further configured to, subsequently to copying the data, compare at least part of the local current-version number with another number in the shared memory that indicates a version of the data, and, in response to the at least part of the local current-version number being equal to the other number, return the copy of the data.

In some embodiments, the processor is configured to compare the at least part of the local current-version number with the other number by atomically comparing the at least part of the local current-version number with the other number.

In some embodiments, the processor is configured to compare the at least part of the local current-version number with the other number by:
atomically copying the other number to an other-number copy, and
comparing the at least part of the local current-version number with the other-number copy.

In some embodiments,
the processor is configured to atomically copy the shared current-version number, copy the data, compare the at least part of the local current-version number with the other number, and return the copy of the data by executing a first execution thread that reads from the shared memory, and the shared memory is shared between the first execution thread and a second execution thread that writes to the shared memory.

In some embodiments, the local current-version number includes a cycle number and an index number, the shared memory stores a cyclic array, the processor is configured to copy the data from an element of the cyclic array having the index number, and the processor is configured to compare the at least part of the local current-version number with the other number by comparing the cycle number with the other number.

There is further provided, in accordance with some embodiments of the present invention, a system that includes a shared memory and one or more processors. The processors are configured to allocate, in the shared memory, a current-version number and a cyclic array. The processors are further configured to, subsequently to allocating the current-version number and the cyclic array, by executing a first execution thread, write a series of versions of data to the shared memory, by, for each version of the versions, writing the version to a first element of the cyclic array that follows a second element of the cyclic array referenced by the current-version number, and, subsequently to writing the version, atomically updating the current-version number to reference the first element of the cyclic array. The processors are further configured to, while the first execution thread is executed, by executing a second execution thread, read the current-version number, and, subsequently to reading the current-version number, read one of the versions stored in an element of the cyclic array that is referenced by the current-version number.

There is further provided, in accordance with some embodiments of the present invention, a method that includes computing a local current-version number by incrementing a shared current-version number that is stored in a shared memory. The method further includes, subsequently to computing the local current-version number, atomically writing at least part of the local current-version number to a portion of the shared memory that is referenced by the local current-version number. The method further includes, subsequently to atomically writing the at least part of the local current-version number, storing data in the shared memory in association with the at least part of the local current-version number, and, subsequently to storing the data, atomically overwriting the shared current-version number with the local current-version number.

There is further provided, in accordance with some embodiments of the present invention, a method that includes atomically copying a shared current-version number from a shared memory to a local current-version number. The method further includes, subsequently to atomically copying the shared current-version number, copying data from a portion of the shared memory that is referenced by the local current-version number. The method further includes, subsequently to copying the data, comparing at least part of the local current-version number with another number in the shared memory that indicates a version of the data, and, in response to the at least part of the local current-version number being equal to the other number, returning the copy of the data.

There is further provided, in accordance with some embodiments of the present invention, a method that includes allocating, in a shared memory, a current-version number and a cyclic array. The method further includes, subsequently to allocating the current-version number and the cyclic array, writing, by a first execution thread, a series of versions of data to the shared memory, by, for each version of the versions, writing the version to a first element of the cyclic array that follows a second element of the cyclic array referenced by the current-version number, and, subsequently to writing the version, atomically updating the current-version number to reference the first element of the cyclic array. The method further includes, while the first execution thread is writing the series of versions of the data, reading, by a second execution thread, the current-version number, and, subsequently to reading the current-version number, reading one of the versions stored in an element of the cyclic array that is referenced by the current-version number.

The present invention will be more fully understood from the following detailed description of embodiments thereof, taken together with the drawings, in which:

DETAILED DESCRIPTION OF EMBODIMENTS

Overview

Figure 1:
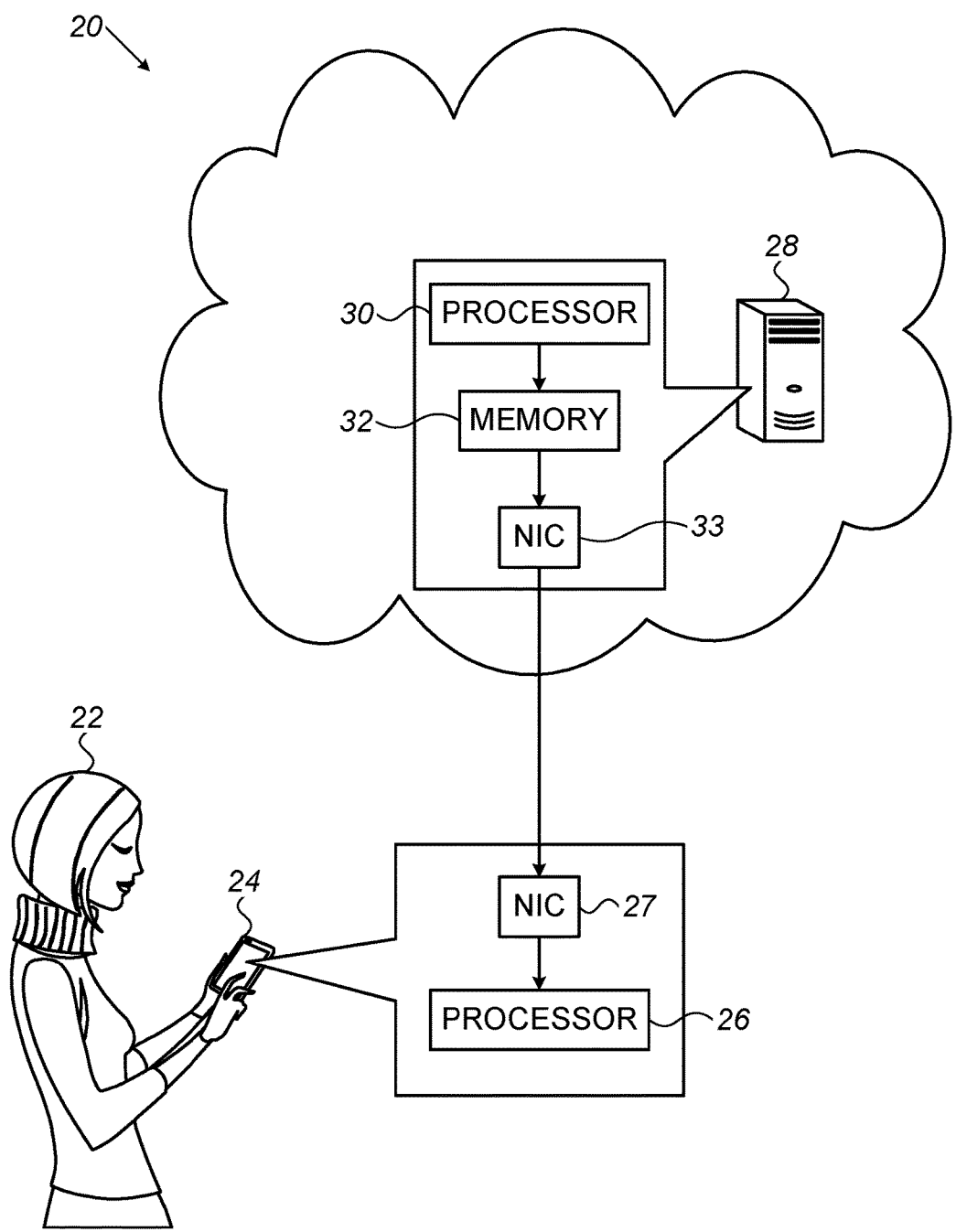
FIG. 1 is a schematic illustration of a system for writing to and reading from a shared memory, in accordance with some embodiments of the present invention.

In many computer systems, memory is shared between multiple, concurrently-running threads of execution. In such systems, a challenge arises in cases in which a write thread (or "writer") and a read thread (or "reader") access a particular portion of memory at the same time. For example, if the writer updates data stored in the shared memory while the reader is reading the data, the reader may return corrupt, partially-updated data.

One hypothetical solution is for the first thread that accesses the shared memory to place a lock on the shared memory, such that the second thread cannot access the shared memory until the first thread terminates and removes the lock. However, a disadvantage with this solution is that the first thread may crash before removing the lock. In such an event, especially if the first thread belongs to a process run by the operating system (OS), the lock may remain in place for an extended period of time.

To address this challenge, embodiments of the present invention provide a method for versioning data in a shared memory, such that a writer, and any number of readers, may concurrently access the data without the risk of a reader returning corrupt data, and without the placement of any locks. Per this method, a cyclic array is allocated in the shared memory, each element of the array being designated for a different respective version of the data that is to be stored. Each version of the data has an associated version number, which includes an index number, corresponding to the index of the array at which the version is stored, and a cycle number, which is stored in association with the version. A "current version" (CV) variable stores the version number of the most-recently written version of the data.

To write a new version of the data to the array, a writer copies CV, and then increments this copy by one, i.e., the writer assigns the value CV+1 to a temporary variable L (L=CV+1). As further described below with reference to FIGS. 2A-B, this operation causes the index number of L to refer to the first element in the array that follows the element storing the most recent version of the data. In the event that the element storing the most recent version of the data is the last element in the array, the operation L=CV+1 causes the index number of L to refer to the first array element, and the cycle number of L to be one greater than the cycle number of CV.

The writer then atomically stores the cycle number of L in the array element having the index number of L. Subsequently, the writer writes the latest version of the data to the array element. Following this write operation, the writer atomically copies L to CV, such that CV references the latest version of the data.

To read from the array, a reader atomically copies CV to a temporary variable L, and then reads the data stored in the array element referenced by the index number of L, i.e., the reader copies the data in this array element to another location. The reader then atomically copies the cycle number of the array element to another variable, and then compares this variable to the cycle number of L. (Alternatively, the reader may atomically compare the cycle number of the array element to the cycle number of L.) If the two values are equal—indicating that the array element was not updated by the writer while the reader was reading the data—the reader returns the data. Otherwise, the reader restarts the read operation, by recopying CV to L, and then proceeding as described above.

Advantageously, as noted above, the modification of any current version numbers or cycle numbers, as performed by the writer, is performed atomically, such that the reader cannot read the current version number or cycle number while the modification is in progress. Similarly, the copying of any current version numbers or cycle numbers, as performed by the reader, is performed atomically, such that the writer cannot modify the current version number or cycle number while the copy is in progress. Hence, the reader is inhibited from reading a corrupt current version number or cycle number. (In the context of the present application, including the claims, an atomic operation on a resource, such as a portion of memory, is an operation that cannot be interrupted by any other operation on the same resource.)

System Description

Reference is initially made to FIG. 1, which is a schematic illustration of a system 20 for writing to and reading from a shared memory 32, in accordance with some embodiments of the present invention.

FIG. 1 depicts a user 22 using a computing device 24, such as a smartphone, tablet, laptop computer, or desktop computer, to retrieve data from a remote server 28, e.g., over the Internet. Server 28 comprises a processor 30 and a shared memory 32, along with a network interface controller (NIC) 33, configured to exchange communication with other devices over a network, such as the Internet.

Processor 30 is configured to execute various processes, each of which may run at any level of privilege (or "protection ring"), and may comprise any number of threads of execution. In executing one particular thread of execution, the processor operates as a writer, by writing to shared memory 32, as indicated in FIG. 1 by an arrow pointing from processor 30 to shared memory 32. Hence, hereinbelow, the term "writer" may refer to processor 30, or to the particular execution thread, run by processor 30, that writes to shared memory 32.

Device 24 comprises a processor 26, along with a network interface controller (NIC) 27. Processor 26 is also configured to execute various processes, each of which may run at any level of privilege, and may comprise any number of threads of execution. In executing one particular thread of execution, processor 26 operates as a reader, by reading from shared memory 32. For example, as indicated in FIG. 1, processor 26 may read from the shared memory by communicating a read request, via NIC 27, to NIC 33. Subsequently to NIC 33 receiving the request, NIC 33 may retrieve the requested data from the shared memory, or pass the request to processor 30, such that processor 30 retrieves the requested data from the shared memory. NIC 33 may then communicate the data, via NIC 27, to processor 26. Hence, hereinbelow, the term "reader" may refer to processor 26, or to the particular execution thread, run by processor 26, that reads from shared memory 32.

Shared memory 32 is shared by the writer and the reader, along with, potentially, any number of other readers not illustrated in FIG. 1. Shared memory 32 may constitute at least a portion of a volatile or non-volatile memory, such as a random access memory (RAM), internal or external hard drive, or flash drive. For example, server 28 may allocate a first portion of its RAM or internal hard drive as a local memory, which is not shared with any remote process, and another portion of its RAM or internal hard drive as a shared memory, which is shared one or more remote processes. The data written to shared memory 32 may include any suitable type of data, such as numbers, images, or data structures that include multiple different types of data.

In system 20, the writer writes a series of versions of data to the shared memory. (For example, the writer may repeatedly receive an image from a video camera, and write the image to the shared memory.) The reader, in turn, may—once, or repeatedly—read a version of the data from the shared memory. Typically, in the type of scenario depicted in FIG. 1, the writer writes relatively quickly to the shared memory, whereas the reader, due to its remoteness from the shared memory, reads relatively slowly from the shared memory. Thus, for example, while the reader is still reading a first version of the data, the writer may begin—or even finish—writing one or more subsequent versions of the data. Advantageously, however, the techniques described below with reference to the subsequent figures help prevent the reader from returning corrupt data. Thus, for example, if a particular portion of the shared memory stores a first version of the data, and the writer begins to overwrite this portion of the memory with a second version of the data before the reader finishes reading the first version, the reader will not return the data that was read, since this data is potentially a hybrid of the first version and the second version.

Notwithstanding the particular scenario depicted in FIG. 1, it is noted that the techniques described herein may be practiced in any suitable scenario in which memory is shared by a write thread and one or more read threads. For example, in some cases, a write thread, and at least one read thread that shares the shared memory with the write thread, may be executed by a single common processor. (In such cases, the write thread and the read thread may belong to the same process.) Each of the devices that executes a write thread and/or a read thread may be local to, or remote from, the shared memory. Each device may comprise any suitable circuitry configured to facilitate writing to and/or reading from the shared memory, such as, for example, a memory controller, a memory management unit, and/or a network interface such as a NIC. Such circuitry is used by the processor of the device to write to and/or read from the shared memory.

In general, each of processor 26 and processor 30 may be embodied as a single processor, or as a cooperatively networked or clustered set of processors. Each of processor 26 and processor 30 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Figure 2B:
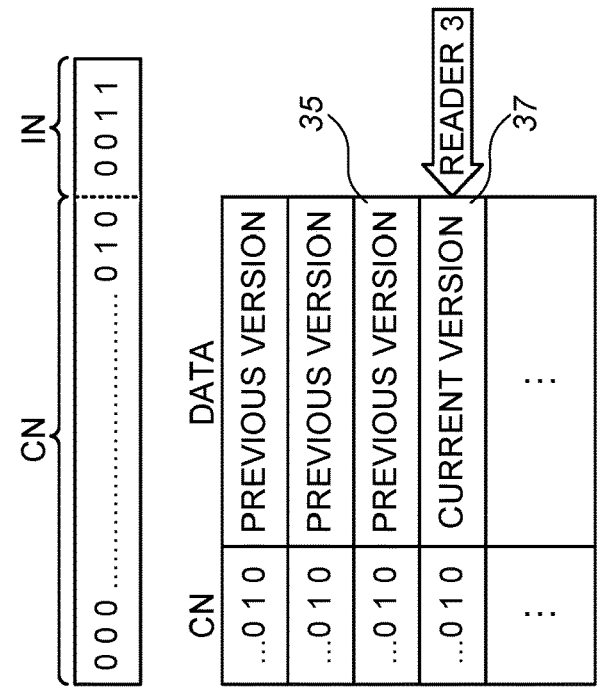
FIGS. 2A-B are schematic illustrations of information stored in a shared memory, in accordance with some embodiments of the present invention.
Figure 2A:
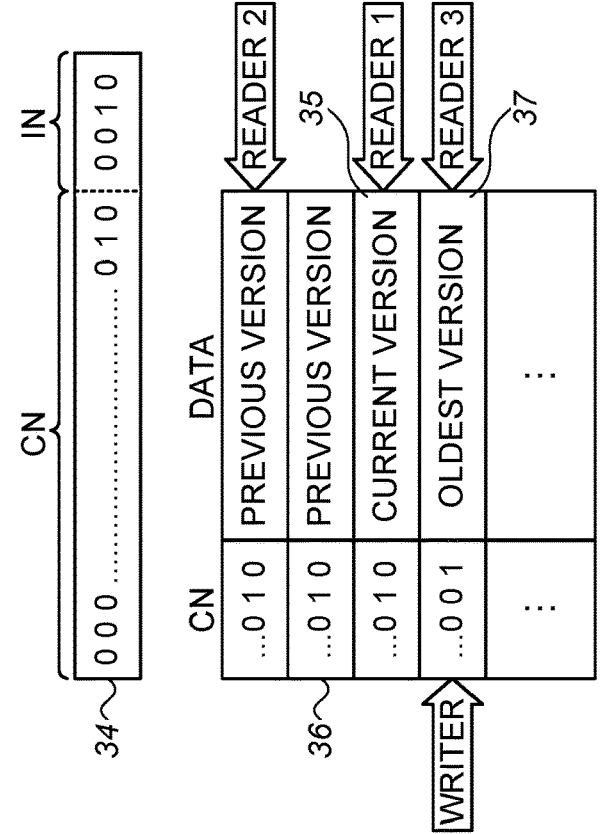

Reference is now made to FIGS. 2A-B, which are schematic illustrations of information stored in shared memory 32, in accordance with some embodiments of the present invention.

Before any data is written to shared memory 32, an allocating execution thread allocates, in the shared memory, a data structure configured to store multiple versions of the data. As further described below, this data structure may be further configured to store multiple version numbers, or the allocating thread may allocate a separate data structure configured to store multiple version numbers, such that each version of the data may be stored in memory 32 in association with its version number. The allocating execution thread further allocates, in the shared memory, a shared current-version number 34, which is configured to reference, at any time, the portion of the allocated data structure that stores the current version of the data.

The write execution thread, the read execution thread, or any other execution thread—such as a thread executed by the OS of any one of the relevant devices—may function as the allocating thread, by allocating the data structure and the shared current-version number as described above. For example, upon server 28 launching an application that writes to the shared memory, this application may allocate the data structure and the shared current-version number. Alternatively, this application may request that the OS of server 28 allocate the data structure and the shared current-version number, or the OS of server 28 may perform this allocation at startup.

Typically, the allocated data structure includes a cyclic array 36. Successive versions of the data are stored in successive elements of the cyclic array, such that each version of the data has an associated version number that includes (a) an index number, which refers to the index of the array element in which the version is stored, and (b) a cycle number (CN), which represents the number of cycles—i.e., passes through the array—that were performed prior to this version being stored. For example, assuming a convention in which zero is the lowest value of both the index number and the cycle number, a particular version of the data that is stored in the tenth element of the array on the second pass through the array would have an associated index number of 9 and cycle number of 1. Shared current-version number 34 also includes an index number (IN), which matches the index number of the current version of the data (and thus references the element of the cyclic array in which the current version is stored), and a cycle number (CN), which matches the cycle number of the current version.

For example, in FIG. 2A, the index number of the shared current-version number is 2 (0010), indicating that the element of the cyclic array having an index of 2—i.e., the third element in the array—contains the current version of the data. The cycle number of the shared current-version number is also 2, indicating that the current version of the data has a cycle number of 2.

Typically, the shared current-version number includes a plurality of higher-order bits that represent the cycle number, followed by a plurality of lower-order bits that represent the index number. An advantage of such embodiments is that the writer does not need to separately modify the index number and the cycle number after each write operation; rather, after each new version of the data is written to the cyclic array, the writer may simply increment the shared current-version number by one.

In general, each of the index number and the cycle number may consist of any number of bits. An index number having k bits can attain $2^k$ different values; therefore, for an index number of k bits, the cyclic array is generally of size $2^k$, i.e., there are $2^k$ elements in the cyclic array. As a purely illustrative example, the index number may have 4 bits, and the cycle number may have 60 bits.

Typically, each version number is stored in array 36 together with the corresponding version of the data. For example, each element of array 36 may store a keyed structure with two key-value pairs: a first key-value pair for the version of the data, and a second key-value pair for the version number of the version. Alternatively, the version numbers may be stored in a separate, parallel cyclic array, each version number being stored at the same index as the corresponding version of the data.

In practice, since the index number of each version is indicated implicitly by the position in array 36 at which the version is stored, there is typically no need to store the entire version number. Instead, as illustrated in FIGS. 2A-B, it may be sufficient to store only the cycle number in association with the version.

A brief description of the operation of system 20 is now provided, with reference to FIGS. 2A-B. Further details regarding the operation of system 20 are provided below, with reference to the subsequent figures.

FIG. 2A depicts three readers—reader 1, reader 2, and reader 3—reading different respective versions of data from the cyclic array. In particular, reader 1 reads the current version of the data from an element 35 of the array, reader 2 reads an older version of the data from another element, and reader 3 reads the oldest version of the data from an element 37. (Due to the cyclicality of array 36, the oldest version immediately follows the current version.) The shared current-version number points to element 35, the third element in array 36.

While the readers read, a writer begins to write a new version of the data to element 37. In particular, as further described below with reference to FIG. 3, the writer uses shared current-version number 34 to locate element 37, increments, by one, the cycle number stored in element 37, and then begins to overwrite the data stored in this element.

FIG. 2B depicts the situation in shared memory 32 following the write operation. This situation differs from the situation depicted in FIG. 2A, in that the oldest version of the data has been replaced with the new current version of the data, and the associated cycle number has been incremented. Furthermore, the shared current-version number has been updated to reference the new current version; in particular, the shared current-version number now points to element 37 (the fourth element in the array), instead of element 35. Moreover, reader 1 and reader 2 have successfully completed reading their respective versions of the data. Reader 3, however, must re-execute its read operation, due to the writer having updating the data stored in element 37 before reader 3 could finish its previous read operation.

Writing to the Shared Memory

Figure 3:
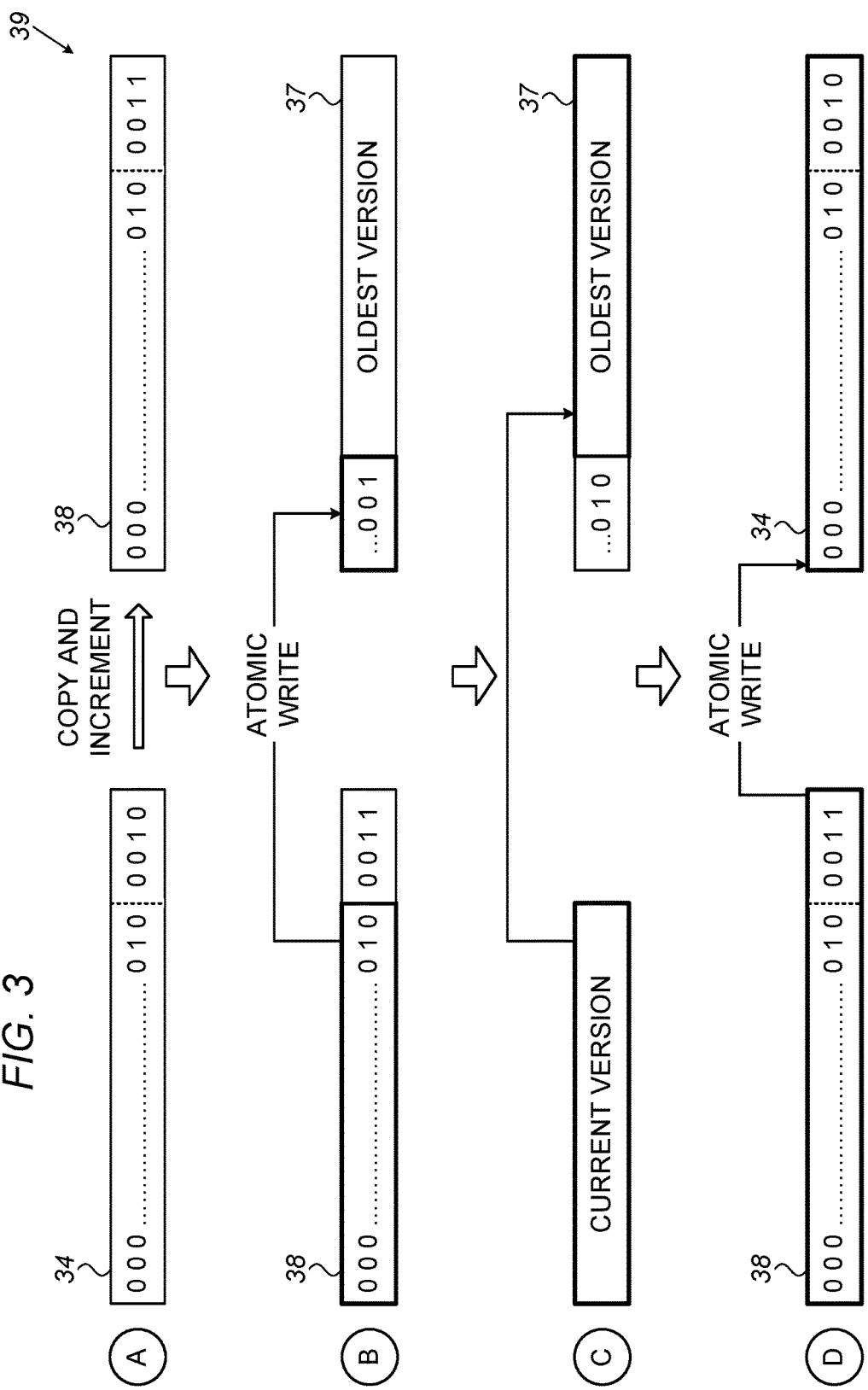
FIG. 3 is a flow diagram for a write operation performed by a writer, in accordance with some embodiments of the present invention.

Reference is now made to FIG. 3, which is a flow diagram for a write operation 39 performed by a writer, in accordance with some embodiments of the present invention. (By way of example, FIG. 3 shows the particular write operation of FIGS. 2A-B.)

First, in step A, the writer computes a local current-version number 38 by incrementing shared current-version number 34. In other words, the writer copies the shared current-version number to another location in memory (that is typically not shared), and then increments this copy, typically by one.

Subsequently, in step B, the writer atomically writes at least part of local current-version number 38 to the portion of the shared memory that is referenced by the local current-version number. By atomically writing the cycle number, the writer prevents the reader from reading a corrupt cycle number in cycle-number-copying step 46 of method 40, described below with reference to FIG. 4.

For example, as described above for the shared current-version number, the local current-version number may include a cycle number and an index number; for example, the local current-version number may include a plurality of higher-order bits that represent the cycle number, followed by a plurality of lower-order bits that represent the index number. In such embodiments, the writer may atomically write the cycle number of the local current-version number to the element of array 36 (or of another, parallel array) that is referenced by the index number of the local current-version number. (In doing this, the writer may overwrite another cycle number previously stored at this location.) For example, in FIG. 2A and FIG. 3, the writer atomically writes the cycle number ( . . . 010) of the local current-version number to element 37 (the fourth element of array 36), which has the index number (0011=3) of the local current-version number. (In each of steps B-D of FIG. 3, the portions of memory from which or to which information is copied are indicated by a thickened border.)

Next, in step C, the writer stores the new current version (i.e., the latest version) of the data in the shared memory, in association with the at least part of the local current-version number that was stored in the shared memory at step B. For example, the writer may store the new current version to the element of array 36 having the index number of the local current-version number, such that the new current version and the cycle number are associated with one another by virtue of being stored in the same array element, or by virtue of being stored in parallel array elements having the same index number. (In storing the new current version, the writer may overwrite another version of the data that was previously stored at this location.)

Subsequently to storing the data, the writer, in step D, atomically overwrites the shared current-version number with the local current-version number, such that the shared current-version number points to the latest version of the data. By atomically writing the new shared current-version number, the writer prevents the reader from reading a corrupt shared current-version number at current-version-number-copying step 42 of method 40, described below with reference to FIG. 4.

Advantageously, the writer may perform steps B-D without locking any portion of the shared memory. Hence, any number of readers may begin, or continue, to read the shared current-version number, and/or data in array 36, while the writer operates. (It is noted that the atomic writing of steps B and D may be implemented by placing a hardware-level lock on the relevant portion of the shared memory while the atomic write is in progress. Nonetheless, since such a lock is implemented at the hardware level, rather than at the software level, steps B and D are said to be lockless.)

The writer may write a series of versions of the data, by repeatedly performing a write operation, e.g., as described with reference to FIG. 3. That is, for each of the versions in the series, the writer may write the version to the element of array 36 that follows the element referenced by the shared current-version number (e.g., by executing steps A-C), and, subsequently to writing the version, atomically update the shared current-version number to reference the element to which the version was written (e.g., by executing step D). (After the cycle number attains its maximum value, the cycle number is reset to zero.)

Reading from the Shared Memory

Figure 4:
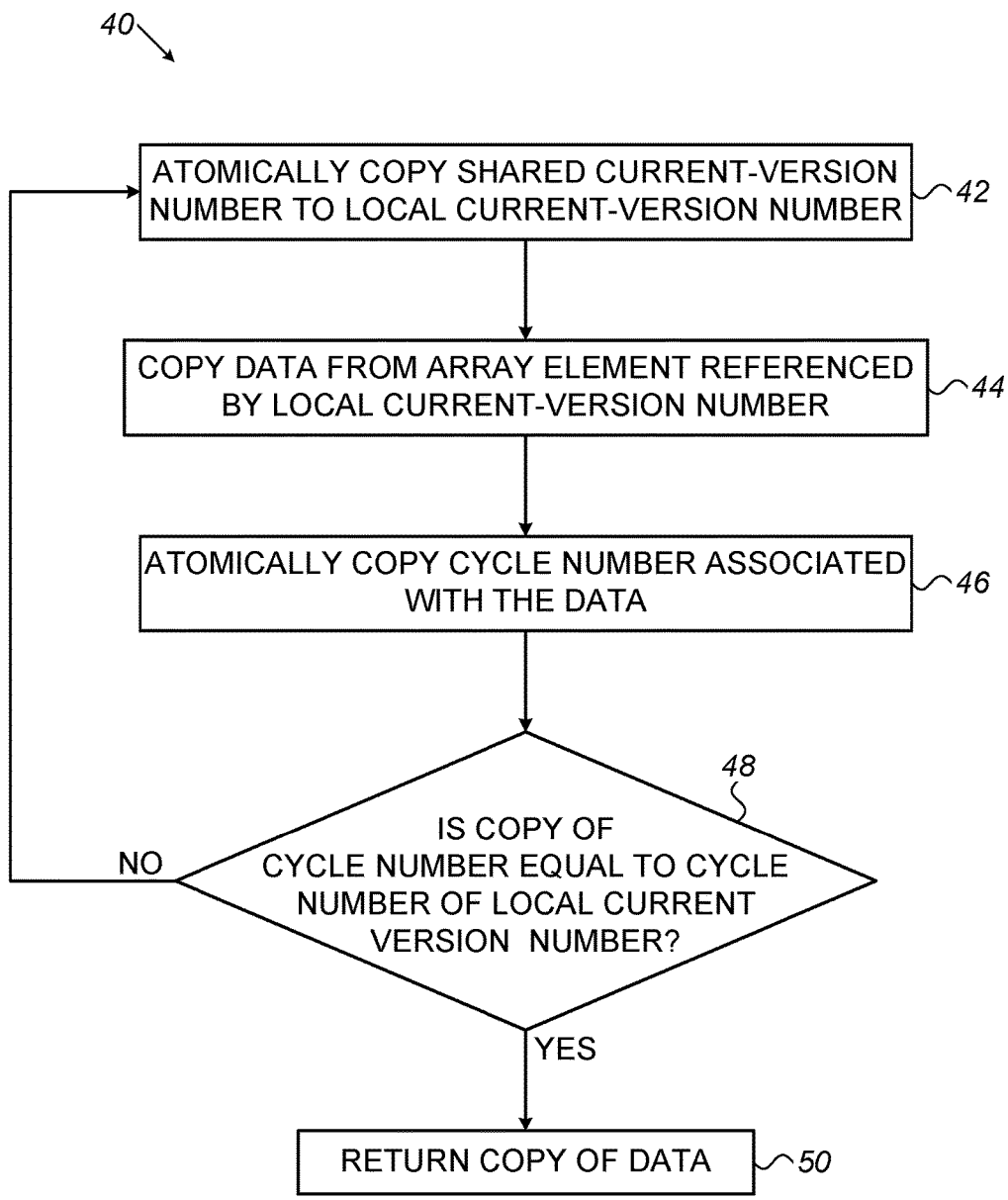
FIG. 4 is a schematic illustration of a method for reading data from a shared memory, in accordance with some embodiments of the present invention.

Reference is now made to FIG. 4, which is a schematic illustration of a method 40 for reading data from shared memory 32, in accordance with some embodiments of the present invention. Method 40 is performed by any reader attempting to read data from the shared memory.

Method 40 begins with a current-version-number-copying step 42, at which the reader atomically copies the shared current-version number to a local current-version number. (This local current-version number is different from local current-version number 38 shown in FIG. 3, which belongs to the writer.) By atomically copying the shared current-version number, the reader ensures that the writer does not modify the shared current-version number while the copy is in progress.

Next, at a data-copying step 44, the reader copies the version of the data that is pointed to by the local current-version number, i.e., the reader copies data from the portion of the shared memory that is referenced by the local current-version number. For example, the reader's local current-version number may include a cycle number and an index number, and the reader may copy data from the element of array 36 corresponding to the index number.

Subsequently, the reader checks whether the writer modified the data while data-copying step 44 was in progress. To perform this check, the reader compares at least part of the local current-version number with another number in the shared memory that indicates the version of the data that was copied. If these two numbers are equal to one another, the reader assumes that the writer did not modify the data, since the writer is expected to update this number before modifying any of the data stored in association with this number. Otherwise, the reader assumes that the writer modified the data.

For example, the reader may compare the cycle number of the local current-version number, referred to hereinbelow as "CN1," with the cycle number that is stored in array 36 in association with the data that was copied, referred to hereinbelow as "CN2." In some embodiments, the reader performs this comparison by first, at a cycle-number-copying step 46, atomically copying CN2, and then, at a comparing step 48, comparing the copy of CN2 to CN1. In other embodiments, cycle-number-copying step 46 and comparing step 48 are combined into a single atomic-comparing step, at which the reader atomically compares CN1 with CN2. By atomically copying CN2 at cycle-number-copying step 46, or atomically comparing CN1 with CN2, the reader ensures that the writer does not modify CN2 while the relevant operation is in progress.

In response to the compared numbers (e.g., cycle numbers) being equal to one another (as in the case of reader 1 and reader 2 of FIG. 2A), the reader returns the copy of the data, at a returning step 50. (For example, the reader may process the data and/or output the data to a user, and/or pass the data to another execution thread.) Otherwise (as in the case of reader 3 of FIG. 2A), the reader retries the read operation, by returning to current-version-number-copying step 42.

In some embodiments, at returning step 50, the reader returns, in addition to the data itself, the version number of the data that was read. The reader may also reread the current version number after reading the data, and return this number along with the version number of the data, such that a user may ascertain the up-to-datedness of the data that was returned. Alternatively or additionally, after rereading the current version number, the reader may calculate the difference between the current version number and the version number of the data, and compare this difference to a threshold. If the difference exceeds the threshold, the reader may reread the data (by returning to current-version-number-copying step 42), in order to return a more current version.

Method 40 may be performed, in parallel, by each of any number of readers, while the writer writes a series of versions of data as described above with reference to FIG. 3. That is, while the writer writes the series of versions, any reader may read the current-version-number, and then read the version that is referenced by the current-version-number.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
   circuitry, configured to facilitate writing to a shared memory that stores a cyclic array; and
   a processor, configured to:
      compute a local current-version number, which includes a cycle number and an index number, by incrementing a shared current-version number that is stored in the shared memory,
      subsequently to computing the local current-version number, using the circuitry, atomically write the cycle number of the local current-version number to a portion of the shared memory that is referenced by the local current-version number,
      subsequently to atomically writing the cycle number of the local current-version number, store data in association with the cycle number of the local current-version number in an element of the cyclic array having the index number, and
      subsequently to storing the data, atomically overwrite the shared current-version number with the local current-version number.

2. The apparatus according to claim 1,
   wherein the processor is configured to compute the local current-version number, atomically write the cycle number of the local current-version number, store the data, and atomically overwrite the shared current-version number by executing a first execution thread that writes to the shared memory, and
   wherein the shared memory is shared between the first execution thread and a second execution thread that reads from the shared memory.

3. The apparatus according to claim 2, wherein the processor is configured to atomically write the cycle number of the local current-version number, store the data, and atomically overwrite the shared current-version number without locking any portion of the shared memory.

4. The apparatus according to claim 2,
   wherein the processor is a first processor and the local current-version number is a first local current-version number, and
   wherein the apparatus further comprises a second processor, configured to execute the second execution thread by:
      atomically copying the shared current-version number, which is equal to the first local current-version number by virtue of the overwriting, from the shared memory to a second local current-version number,
      subsequently to atomically copying the shared current-version number, copying the data from the element of the cyclic array, in response to the element being referenced by the second local current-version number,
      subsequently to copying the data, comparing the cycle number of the second local current-version number with another cycle number in the shared memory that indicates a version of the data, and
      in response to the cycle number of the second local current-version number being equal to the other cycle number, returning the copy of the data.

5. The apparatus according to claim 4, wherein the processor is configured to compare the cycle number of the second local current-version number with the other cycle number by atomically comparing the cycle number of the second local current-version number with the other cycle number.

6. The apparatus according to claim 4, wherein the processor is configured to compare the cycle number of the second local current-version number with the other cycle number by:
   atomically copying the other cycle number to an other-number copy, and
   comparing the cycle number of the second local current-version number with the other-number copy.

7. The apparatus according to claim 2,
   wherein the local current-version number is a first local current-version number, and
   wherein the processor is further configured to execute the second execution thread by:
      atomically copying the shared current-version number, which is equal to the first local current-version number by virtue of the overwriting, from the shared memory to a second local current-version number, subsequently to atomically copying the shared current-version number, copying the data from the element of the cyclic array, in response to the element being referenced by the second local current-version number, subsequently to copying the data, comparing the cycle number of the second local current-version number with another cycle number in the shared memory that indicates a version of the data, and in response to the cycle number of the second local current-version number being equal to the other cycle number, returning the copy of the data.

8. The apparatus according to claim 1, wherein the processor is configured to write the cycle number of the local current-version number to the element of the cyclic array.

9. The apparatus according to claim 1, wherein the cyclic array is a first cyclic array, and wherein the processor is configured to write the cycle number of the local current-version number to another element of a second cyclic array having the index number.

10. The apparatus according to claim 1, wherein the local current-version number includes a plurality of higher-order bits that represent the cycle number, followed by a plurality of lower-order bits that represent the index number.

11. A system, comprising:
a shared memory; and
one or more processors, configured to:
    allocate, in the shared memory, a current-version number and a cyclic array, and
    subsequently to allocating the current-version number and the cyclic array:
        by executing a first execution thread, write a series of versions of data to the shared memory, by, for each version of the versions:
            writing the version to a first element of the cyclic array that follows a second element of the cyclic array referenced by the current-version number, and
            subsequently to writing the version, atomically updating the current-version number to reference the first element of the cyclic array, and
        while the first execution thread is executed:
            by executing a second execution thread, read the current-version number, and
            subsequently to reading the current-version number, read one of the versions stored in an element of the cyclic array that is referenced by the current-version number.

12. A method, comprising:
computing a local current-version number, which includes a cycle number and an index number, by incrementing a shared current-version number that is stored in a shared memory that stores a cyclic array;
subsequently to computing the local current-version number, atomically writing the cycle number of the local current-version number to a portion of the shared memory that is referenced by the local current-version number;
subsequently to atomically writing the cycle number of the local current-version number, storing data in association with the cycle number of the local current-version number in an element of the cyclic array having the index number; and subsequently to storing the data, atomically overwriting the shared current-version number with the local current-version number.

13. The method according to claim 12,
wherein the computing of the local current-version number, the atomic writing of the cycle number of the local current-version number, the storing of the data, and the atomic overwriting of the shared current-version number are performed by a first execution thread that writes to the shared memory, and
wherein the shared memory is shared between the first execution thread and a second execution thread that reads from the shared memory.

14. The method according to claim 13, comprising
wherein the local current-version number is a first local current-version number, and
wherein the method further comprises executing the second execution thread by:
    atomically copying the shared current-version number, which is equal to the first local current-version number by virtue of the overwriting, from the shared memory to a second local current-version number;
    subsequently to atomically copying the shared current-version number, copying the data from the element of the cyclic array, in response to the element being referenced by the second local current-version number;
    subsequently to copying the data, comparing the cycle number of the second local current-version number with another cycle number in the shared memory that indicates a version of the data; and
    in response to the cycle number of the second local current-version number being equal to the other cycle number, returning the copy of the data.

15. The method according to claim 14, wherein comparing the cycle number of the second local current-version number with the other cycle number comprises atomically comparing the cycle number of the second local current-version number with the other cycle number.

16. The method according to claim 14, wherein comparing the cycle number of the second local current-version number with the other cycle number comprises:
    atomically copying the other cycle number to an other-number copy; and
    comparing the cycle number of the second local current-version number with the other-number copy.

17. The method according to claim 12, wherein the atomic writing of the cycle number of the local current-version number, the storing of the data, and the atomic overwriting of the shared current-version number are performed without locking any portion of the shared memory.

18. The method according to claim 12, wherein writing the cycle number of the local current-version number comprises writing the at least part cycle number of the local current-version number to the element of the cyclic array.

19. The method according to claim 12, wherein the cyclic array is a first cyclic array, and wherein writing the cycle number of the local current-version number comprises writing the cycle number of the local current-version number to another element of a second cyclic array having the index number.

20. The method according to claim 12, wherein the local current-version number includes a plurality of higher-order bits that represent the cycle number, followed by a plurality of lower-order bits that represent the index number.

21. A method, comprising:
allocating, in a shared memory, a current-version number and a cyclic array; and
subsequently to allocating the current-version number and the cyclic array:
  writing, by a first execution thread, a series of versions of data to the shared memory, by, for each version of the versions:
    writing the version to a first element of the cyclic array that follows a second element of the cyclic array referenced by the current-version number, and
    subsequently to writing the version, atomically updating the current-version number to reference the first element of the cyclic array, and
  while the first execution thread is writing the series of versions of the data:
    reading, by a second execution thread, the current-version number, and
    subsequently to reading the current-version number, reading one of the versions stored in an element of the cyclic array that is referenced by the current-version number.

22. Apparatus, comprising:
circuitry, configured to facilitate writing to a shared memory shared between a first execution thread, which writes to the shared memory, and a second execution thread, which reads from the shared memory; and
a processor, configured to execute the first execution thread without locking any portion of the shared memory, by:
  computing a local current-version number, by incrementing a shared current-version number stored in the shared memory,
  subsequently to computing the local current-version number, using the circuitry, atomically writing at least part of the local current-version number to a portion of the shared memory that is referenced by the local current-version number,
  subsequently to atomically writing the at least part of the local current-version number, storing data in the shared memory in association with the at least part of the local current-version number, and
  subsequently to storing the data, atomically overwriting the shared current-version number with the local current-version number.

23. The apparatus according to claim 22,
wherein the local current-version number includes a cycle number and an index number,
wherein the at least part of the local current-version number includes the cycle number,
wherein the shared memory stores a cyclic array, and
wherein the processor is configured to store the data in an element of the cyclic array having the index number.

24. The apparatus according to claim 22,
wherein the processor is a first processor and the local current-version number is a first local current-version number, and
wherein the apparatus further comprises a second processor configured to execute the second execution thread by:
  atomically copying the shared current-version number, which is equal to the first local current-version number by virtue of the overwriting, from the shared memory to a second local current-version number,
  subsequently to atomically copying the shared current-version number, copying the data from the portion of the shared memory, in response to the portion of the shared memory being referenced by the second local current-version number,
  subsequently to copying the data, comparing at least part of the second local current-version number with another number in the shared memory that indicates a version of the data, and
  in response to the at least part of the second local current-version number being equal to the other number, returning the copy of the data.

25. The apparatus according to claim 22,
wherein the local current-version number is a first local current-version number, and
wherein the processor is further configured to execute the second execution thread by:
  atomically copying the shared current-version number, which is equal to the first local current-version number by virtue of the overwriting, from the shared memory to a second local current-version number,
  subsequently to atomically copying the shared current-version number, copying the data from the portion of the shared memory, in response to the portion of the shared memory being referenced by the second local current-version number,
  subsequently to copying the data, comparing at least part of the second local current-version number with another number in the shared memory that indicates a version of the data, and
  in response to the at least part of the second local current-version number being equal to the other number, returning the copy of the data.

26. A method, comprising:
in a first execution thread, computing a local current-version number by incrementing a shared current-version number stored in a shared memory shared with a second execution thread that reads from the shared memory; and
in the first execution thread, without locking any portion of the shared memory:
  subsequently to computing the local current-version number, atomically writing at least part of the local current-version number to a portion of the shared memory that is referenced by the local current-version number,
  subsequently to atomically writing the at least part of the local current-version number, storing data in the shared memory in association with the at least part of the local current-version number, and
  subsequently to storing the data, atomically overwriting the shared current-version number with the local current-version number.

27. The method according to claim 26,
wherein the local current-version number includes a cycle number and an index number,
wherein the at least part of the local current-version number includes the cycle number,
wherein the shared memory stores a cyclic array, and
wherein storing the data comprises storing the data in an element of the cyclic array having the index number.

28. The method according to claim 26,
wherein the local current-version number is a first local current-version number, and
wherein the method further comprises executing the second execution thread by:
  atomically copying the shared current-version number, which is equal to the first local current-version number by virtue of the overwriting, from the shared memory to a second local current-version number, subsequently to atomically copying the shared current-version number, copying the data from the portion of the shared memory in response to the portion of the shared memory being referenced by the second local current-version number, subsequently to copying the data, comparing at least part of the second local current-version number with another number in the shared memory that indicates a version of the data, and in response to the at least part of the second local current-version number being equal to the other number, returning the copy of the data.

\* \* \* \* \*